United States Patent [19]
Takeuchi et al.

[11] Patent Number: 4,984,114
[45] Date of Patent: Jan. 8, 1991

[54] FLYING HEAD SLIDER

[75] Inventors: Yoshinori Takeuchi, Ibaraki; Yuzo Yamaguchi, Tsuchiura; Katsuyuki Tanaka; Fumitaka Muranushi, both of Ibaraki; Hiroshi Daito, Odawara, all of Japan

[73] Assignee: Hitachi, Ltd., Tokyo, Japan

[21] Appl. No.: 367,662

[22] Filed: Jun. 19, 1989

[30] Foreign Application Priority Data

Jun. 20, 1988 [JP]  Japan .................. 63-152039

[51] Int. Cl.⁵ .............................................. G11B 5/60
[52] U.S. Cl. .................................................. 360/103
[58] Field of Search .................................. 360/102–103

[56] References Cited

U.S. PATENT DOCUMENTS 4,646,180 2/1987 Ohtsubo ............................ 360/103
4,734,803 3/1988 Nishihira ........................... 360/103

FOREIGN PATENT DOCUMENTS 59-58661 4/1984 Japan ................................. 360/103

OTHER PUBLICATIONS

IBM T.D.B., vol. 27, No. 10A, 3/85; pp. 5820–5821; Magnetic Disk Storage System with Structured Mag. Head Slider.

Primary Examiner—A. J. Heinz
Attorney, Agent, or Firm—Antonelli, Terry, Stout & Kraus

[57] ABSTRACT

A flying head slider for supporting a magnetic head operative to transmit information into and out of a recording medium has a slider body having a surface to be disposed in faced relationship to the recording medium. Positive pressure generating portions are formed on the surface of the slider body to generate a positive pressure during rotation of the recording medium relative to the slider body. A bearing is formed in the fluid-inlet end of each positive pressure generating section to enhance a bearing action due to abrupt compression of fluid. A bleed slot is defined between the positive pressure generating sections and has a fluid-inlet end provided with a negative pressure generating means, whereby the slider stably floats a predetermined distance away from the recording medium during rotation thereof to enable the magnetic head to transmit information.

22 Claims, 5 Drawing Sheets

FLYING HEAD SLIDER

BACKGROUND OF THE INVENTION

1. Field of the Invention

The present invention relates to a flying head slider which floats above a relatively movable recording medium, such as a magnetic disc device, with a minute gap left therebetween, which has an improved floating characteristic and suited for mass production.

2. Description of the Prior Art

An example of the conventional flying head slider for use with a magnetic disc apparatus is the so-called taper-flat type which has a pair of air-bearing rails provided on the opposite sides of the slider and each having a flat surface portion and an oblique surface portion on the air-inlet side of the slider, as disclosed in, for example, Japanese Pat. Publication No. 57-569 corresponding to U.S. Pat. No. 3,823,416 issued Jul. 9, 1974 to Michael Walter Warner. The pair of air-bearing rails define therebetween a bleed slot sufficiently deep enough not to provide any air-bearing function.

The prior art slider has been fabricated in such a manner that the bleed slot is mechanically ground by a slicer, for example, and the oblique surfaces are machined by, for example, a lapping machine. As such, the prior art sliders are each machined by two kinds of working methods and, thus, one unsatisfactory from the view point of productivity.

Recently, the distance over which the slider is required to float above a recording surface has been minimized due to the fact that the density of the recording system is highly increased. Accordingly, the deviation of the floating distances of sliders due to dimensional tolerances thereof must be of a controlled small value. In the case where machining, such as grinding, is employed to work flying sliders, however, it is difficult to control the dimensional tolerances on the order of microns. In addition, sliders are liable to be broken during the machining process.

As discussed above, the productivity and an increase in accuracy have not been, taken into account in the conventional method of manufacture of flying sliders.

In the prior art, moreover, no attention has been paid to the decrease in the deviation of the floating distances of flying sliders caused by the increase in the working accuracy as well as productivity, so that there have been problems with meeting the demands for the decrease in the floating distances of sliders and for the decrease in the sizes thereof. Also, the prior art has not considered reducing the friction caused between the polished recording surface of a recording medium. For this reason, the prior art had a problem that the floating characteristic was unsatisfactory.

SUMMARY OF THE INVENTION

It is an object of the present invention to provide a flying head slider which has an improved floating characteristic and can be manufactured with a high accuracy and is easily mass produced.

The flying head slider according to one aspect of the present invention comprises a slider body adapted to be disposed in opposed relationship to a recording medium and including a surface faced to the recording medium. A plurality of fluid bearing rails forming positive pressure generating means are formed on the surface of the slider body to float the slider body by positive pressure generated due to a fluid flow caused by movement of the recording medium relative to the slider body. A bleed section is formed in the surface of the slider body between the plurality of fluid bearing rails and recessed surfaces thereof. The bleed, section has a fluid inlet end, a fluid outlet end with a cross-sectional area taken transversely of a flow of fluid through the bleed section, being smaller in the fluid inlet end than in the fluid outlet end. A stepped bearing means is formed in each of the positive pressure generating means adjacent to an air inlet end thereof.

In a preferred embodiment of the flying head slider according to the present invention, a gate is disposed at the fluid inlet end of the bleed section to reduce the cross-sectional area of the fluid inlet end of the bleed section. The gate projects beyond the level of the surfaces of the fluid bearing rails.

The flying head slider according to another aspect of the present invention comprises a slider body, a plurality of positive pressure generating means formed on the slider body, means for generating negative pressure between the positive pressure generating means and stopped bearing means formed on the slider body adjacent to a fluid inlet end thereof and associated with the positive pressure generating means, respectively.

The stepped bearing means provide a fluid bearing function due to the viscosity of the fluid flow caused by the rotation of the recording medium, to thereby generate positive pressure. The stepped bearing means are operative to reduce side flow caused by abrupt compression of the fluid at stepped portions, to thereby enhance the bearing action.

The effective cross-sectional area of the bleed section between the pair of fluid bearing rails may preferably be greater in the fluid inlet end than in the fluid outlet end so that the fluid flowing through the bleed section includes expanding flow components which create a negative pressure generating zone which is operative to suppress the generation of positive pressure generated in a shallow bleed section formed in the prior art head slider. Accordingly, the bleed section of the slider according to the present invention can be of a reduced depth.

The above and other objects, features and advantages of the present invention will be made more apparent by the following description with reference to the accompanying drawings.

DESCRIPTION OF THE PREFERRED EMBODIMENTS

Figure 1:
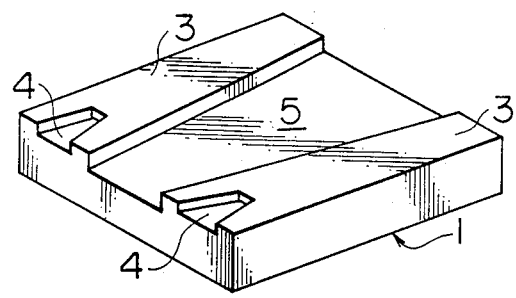
FIG. 1 is a perspective view of an embodiment of the flying head slider according to the present invention.
Figure 2:
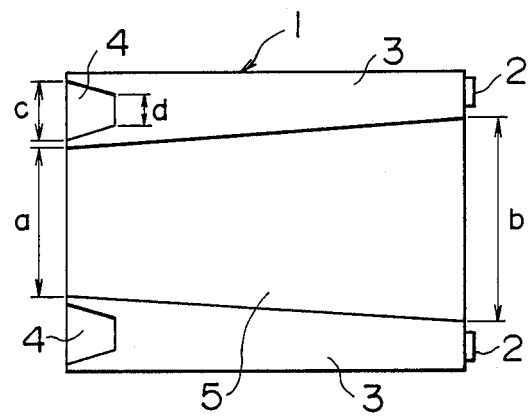
FIG. 2 is a plan view of the slider shown in FIG. 1.
Figure 3:
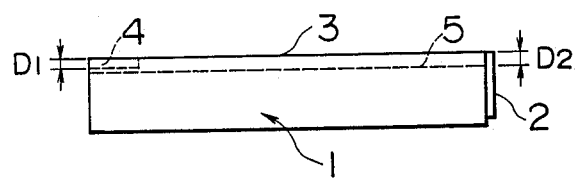
FIG. 3 is a side view of the slider shown in FIG. 1.

An embodiment of the present invention will be described with reference to FIGS. 1 and 2. A slider body 1 has fluid bearing rails 3 having flat surfaces and disposed adjacent the opposite sides of the floating surface of the slider body 1 to form positive pressure generating means. Transducers 2 are mounted on the fluid outlet ends of the fluid-bearing rails 3, respectively. A stepped-bearing means in the form of a groove or recess 4 of a depth D1 (normally, from 1 to 10 microns in the case where the floating distance of the stepped portions of the fluid-bearing rails is 0.5 micron, i.e., the depth D1 is substantially equal to 2 to 20 times of the floating distance) is formed in the fluid-inlet end of the flat surface of each fluid-bearing rail 3. Each recess 4 has opposite side walls which are laterally spaced a distance c at the fluid-inlet end and converge to a dimension d at the fluid-outlet end of the recess. A bleed slot 5 is defined between the two fluid-bearing rails 3 and has a depth D2 which is of the order of from 2 to 20 micron meters which is greatly reduced from the 80 to 200 microns, which is the depth of the bleed slot of the conventional head slider. The fluid-inlet end of the bleed slot 5 has a width a which is smaller than the width b measured at the fluid outlet end of the bleed slot 5. The widthwise dimension of the bleed slot 5 is continuously varied from the width a to the width b.

According to this embodiment of the invention, the fluid-bearing rails 3 both provided with the stepped bearings 4 form stepped bearings which generate a floating force of a positive value due to the viscosity of the air flow. The opposite sides of each recess 4 which forms the stepped bearing laterally surround the fluid flow which enters the recess and, thus, minimize the lateral flows of fluid which would otherwise be caused by a sudden compression of fluid by the step. In addition, because the width c of each recess 4 at the fluid-inlet end thereof is greater than the width d at the fluid-outlet end of the recess, the air is compressed in the lateral or widthwise direction of the recess 4 as the fluid moves through the recess 4 towards its fluid-outlet end such that the recess 4 provides a smooth increase in the compression of fluid to assure a good floating characteristic of the head slider.

On the other hand, because the width a of the fluid inlet-end of the bleed slot 5 is less than the width b of the air-outlet end of the slot 5 to provide an actual cross-sectional area of the bleed slot 5 which is greater in the fluid-outlet end than in the fluid-inlet end, the fluid flowing through the bleed slot 5 is caused to include expanding flow components which establish zones where a negative pressure is formed. This feature of this embodiment of the invention can advantageously eliminate the problem that a positive pressure was generated in the conventional flying head slider in which the bleed slot had the same widths at the air-inlet and outlet ends and the depth was decreased from the fluid-inlet end to the fluid-outlet end.

Figure 4:
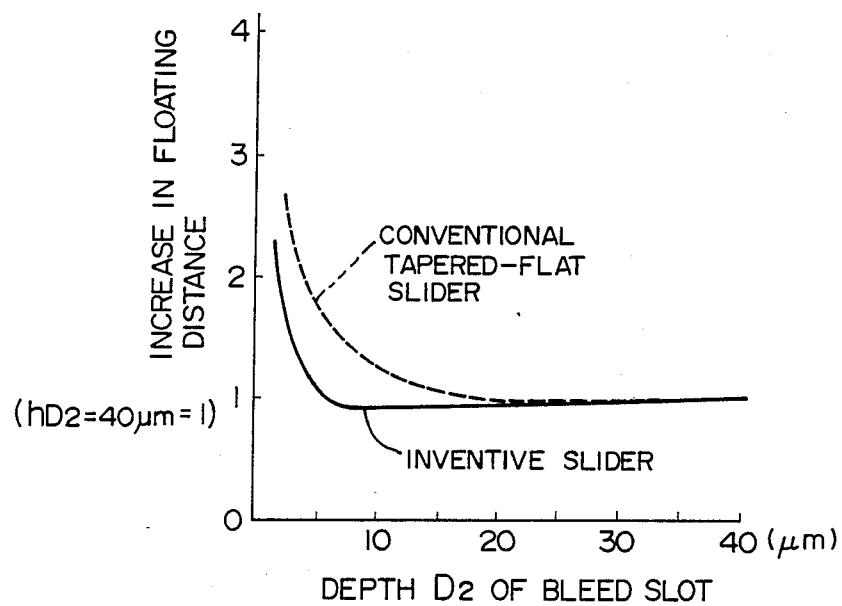
FIG. 4 is a graphical illustration of the relationship between the depth of a bleed slot and the increase in the floating distance.

FIG. 4 graphically illustrates the relationship between the depth D2 of the bleed slot 5 and the increase in the floating distance. The variation of the cross-sectional area of the bleed slot 5 can be adjusted to assure a substantially constant floating distance irrespective of the decrease in the depth D2 of the bleed slot 5 to thereby provide a much more stable floating characteristic than in the prior art.

With the described structure of the flying head slider, the configuration of the floating surface of the slider can be worked by a single high-precision non-mechanical working method, such as laser induction etching method, to provide an excellent stable floating characteristic and also is suited for mass production.

In the described embodiment of the invention, the depth D1 of each recess 4 which forms a stepped bearing is illustrated as being not equal to the depth D2 of the bleed slot 5. However, the configuration may be modified such that the depth D1 is equal to the depth D2 to advantageously assure that the floating surface can be worked by a single step.

In the described embodiment of the invention, moreover, the fluid-bearing rails 3 are shaped such that the width of each fluid-bearing rail 3 is continuously reduced from the fluid-inlet end to the fluid-outlet end, while the bleed slot 5 is shaped such that its width is continuously increased from the fluid-inlet end to the fluid-outlet end. The bleed slot 5 may alternatively be shaped such that the bleed slot 5 is narrow at its portion adjacent to the recesses 4 and is expanded from a midway toward the fluid outlet end. The shape of each recess 4 which forms a stepped bearing may be modified such that the recess has a substantially uniform width from its fluid-inlet end to the fluid-outlet end. As described, the widths of the bleed slot 5 and the stepped bearing recesses 4 are defined by straight lines to provide similar bearings and facilite simplified manufacturing process.

The fluid-bearing rails 3 may alternatively be shaped to have their fluid-outlet ends widened to provide expanded fluid bearing rail portions to facilitate easy mounting of the transducers 2. The provision of these expanded fluid bearing rail portions does not cause any appreciable adverse effect on the bearing function of the bleed slot 5. In the case where the fluid outlet ends of the fluid bearing rails 3 are widened to the extent where the bearing function of the widened fluid-outlet ends of the fluid bearing rails cannot be neglected, a recess of a depth D3 greater than the depth D2 of the bleed slot 5 may be formed in the fluid-outlet end portion of the bleed slot 5 so that an expanding flow of the fluid is formed in the recess to generate a depression or negative pressure which is effective to cancel the bearing function.

Figure 5:
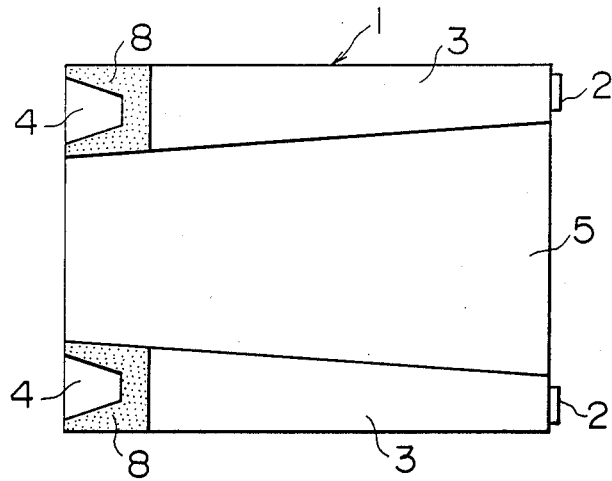
FIG. 5 is a plan view of another embodiment of the slider according to the present invention.
Figure 6:
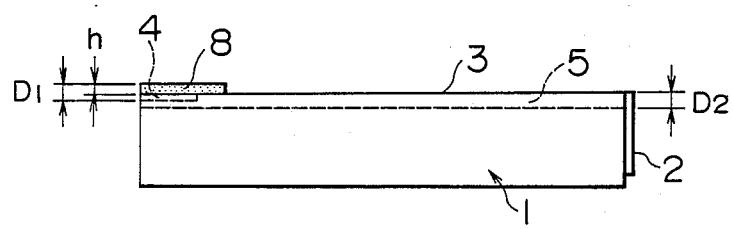
FIG. 6 is a side view of the slider shown in FIG. 5.

FIGS. 5 and 6 show another embodiment of the invention in which a deposit coating 8 of a thin layer of a good sliding resistant material such as a ceramics material (for example, SiC) having a shape the same as that of the stepped bearing, as viewed in top plan view, is provided around each recess 4 at the fluid-inlet end of an associated fluid bearing rail 3 so that the recess 4 is given a depth D4 which includes a thickness h of the deposit coating 8. This embodiment is advantageous in that the adhesion caused between the recording medium and the slider due to water, lubricant or the like when the slider is brought into contact with the recording medium when the latter is stopped can be decreased to advantageously reduce the friction therebetween thereby assuring good starting and stoppage of the recording medium.

In the embodiment shown in FIGS. 5 and 6, the stepped bearings are in the form of recesses 4 are formed in the slider body 1. In place of the recesses 4, however, deposit layers 8 each having a stepped portion may be provided on the fluid-inlet ends of the fluid bearing rails 3 to form stepped bearings for assuring reduced friction, thereby providing improved starting and a stoppage and simplified working step with an increased accuracy.

Figure 7:
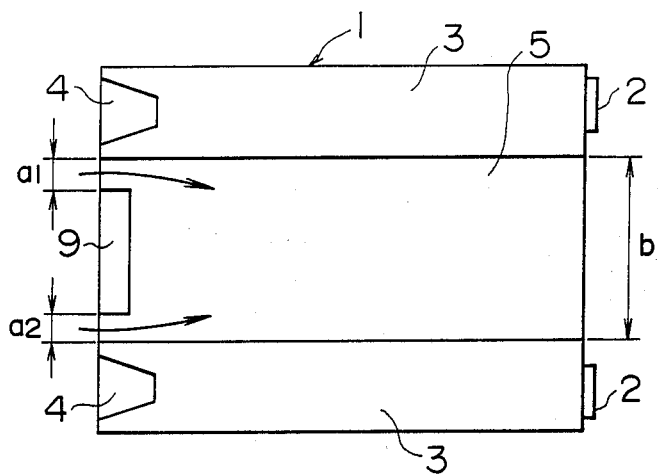
FIG. 7 is a plan view of a further embodiment of the slider according to the present invention.
Figure 8:
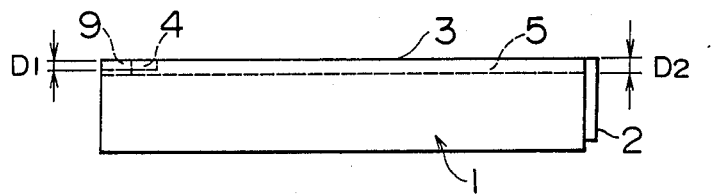
FIG. 8 is a side view of the slider shown in FIG. 7.

FIGS. 7 and 8 show a further embodiment of the invention in which a dam 9 is provided at the fluid-inlet end of the bleed slot 5 to reduce the cross section of the bleed slot 5 taken in a direction transverse to the flow of fluid such that the actual fluid-flowing cross-sectional area of the bleed slot 5 is given by the depth D2 multiplied by the total of the widthwise dimensions al and a2 left on the opposite sides of the gate 9. Due to the provision of this gate 9, the fluid flowing through the bleed slot 5 includes expanding components to form zones in which depression is formed in the fluid flow. This enables the bleed slot 5 to be of a uniform width b over its entire length, with the result that the working of the bleed slot 5 can be simplified. Despite the fact that the dam 9 is provided in the bleed slot 5, however, the bleed slot 5 may also be so shaped as to be expanded from its fluid-inlet end to the fluid outlet end.

A deposit coating (not shown) of a sliding resistant material may be formed on the surface of the gate 9 and have a thickness on the order of submicrons so as not to influence the floating characteristic of the slider, to thereby reduce the adhesion between the slider and the recording medium when they are brought into contact with each other. Such deposit coatings may also be formed on the fluid bearing rails around the recesses 4.

Figure 9:
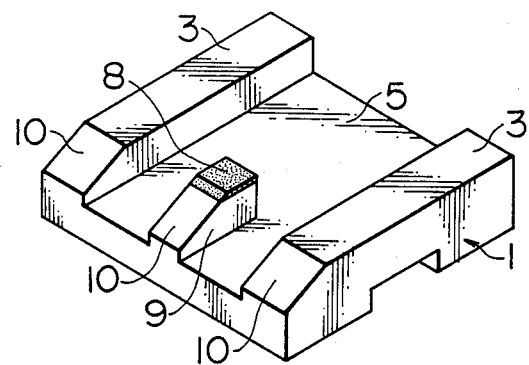
FIG. 9 is a perspective view of a still further embodiment of the slider according to the present invention.
Figure 10:
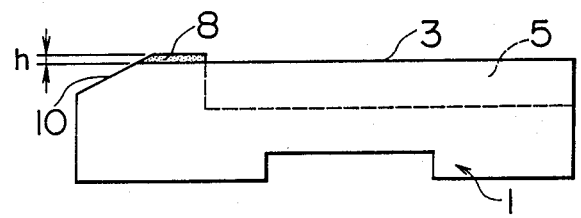
FIG. 10 is a side view of the slider shown in FIG. 9.

FIGS. 9 and 10 show a further embodiment of the invention. Unlike the embodiment shown in FIGS. 7 and 8 in which the gate 9 is provided in the bleed slot 5 of the flying head slider of the type that is provided with fluid bearing rails having stepped bearings 4, the embodiment shown in FIGS. 9 and 10 is a flying head slider of so-called "tapered flat type" that has inclined or oblique surface portions 10 formed in place of the stepped bearings 4 provided in the preceding embodiments. In this type of the flying head slider, a dam 9 similar in shape to a projection is formed at the fluid-inlet end of a bleed slot 5 formed between fluid bearing rails 3. A deposite coating 8 of a thickness h is provided on the top surface of the dam 9 and projects beyond the levels of the top surfaces of the fluid bearing rails 3 by a distance equal to the thickness h of the deposite coating 8. This thickness h is far greater than the roughness of the surface of the slider and the surface of the recording medium. More specifically, the floating distance of the outer surface of the deposit coating 8 from the recording surface during normal rotation of the recording medium should not be less than the floating distance of the fluid-outlet end of the slider from the recording surface. Considering floating stability of the slider, the thickness h of the deposit coating 8 is normally preferably determined to be from ⅓ to ¼ of the difference between the floating distance of the fluid-inlet end of the slider and the floating distance of the fluid-outlet end thereof. In the case where the floating distance of the fluid-outlet end of the slide is 0.25 microns, the thickness h of the deposit coating 8 equals approximately 0.1 microns.

According to this embodiment of the invention, the deposite coating 8 provided at fluid-inlet end of the bleed slot 5 projects beyond the levels of the surfaces of the fluid bearing rails 3 by a distance equal to the thickness h. When the recording medium is stopped, the slider is brought into contact with the recording medium at the deposit coating 8 and the fluid-outlet end of the fluid bearing rails 3. The area of contact between the slider of this embodiment and the recording medium is much reduced than in the case of the conventional tapered flat slider, with a resultant advantage that the friction caused by solid-to-solid contact or by adhesion due to water, lubricating oil or the like can be greatly reduced to achieve an improved floating characteristic. In addition, because the dam 9 and the deposit coating 8 are disposed at the fluid-inlet end of the longitudinal center of the bleed slot 5, the fluid flowing through the bleed slot 5 includes expanding flow components which create negative pressure generating zones which in turn are effective to stabilize the floating. Moreover, the rolling and pitching motions of the slider are taken into account to minimize the contact between the slider and the recording medium due to variation&in the floating distance of the slider, whereby the slider exhibits an improved floating characteristic.

The embodiment shown in FIGS. 9 and 10 may be modified such that the gate 9 and the deposit coating 8 thereon are elongated and extended in the direction transverse to the direction of the flow of the fluid through the bleed slot 5 to reduce the fluid-flowing cross-sectional area of the bleed slot at the fluid-inlet end thereof than that at the fluid-outlet end thereof, thereby positively establishing a zone in the bleed slot where depression (negative pressure) is generated. Accordingly, the bleed slot 5 can be of a decreased depth, so that the slider, excepting its oblique surfaces 10, can be easily worked by, for example, spattering.

In the described embodiments of the invention, the number of the gate 9 is not limited to one and more than one gate may alternatively be provided in side-by-side relationship. The gate 9 may not have a surface to provided with the deposit coating but, instead, project beyond the level of the surfaces of the fluid bearing rails 3. The surface of the gate 9 may be rounded to assure a good sliding contact with the surface of the recording medium.

In the embodiments of the invention in which bleed slots 5 each having a fluid-inlet end and a fluid outlet end are formed between means for generating positive pressure, i.e., fluid bearing rails 3 and in which gates 9 are disposed at the fluid-inlet ends of the bleed slots to create negative pressure generating zones, the fluid-inlet ends of the bleed slots 5 may alternatively be closed to create negative pressure generating zones between the positive pressure generating means 3 and, in addition, stepped bearings may be provided at the fluid-inlet ends of the positive pressure generating means 3 to thereby improve the take-off characteristic and the speed-dependent characteristic of the slider as well as to simplify working steps of manufacture for reducing the cost of manufacture and improving the working accuracy.

What is claimed is:

1. A flying head slider comprising a slider body disposed in opposed relationship to a recording medium and including a surface faced to said recording medium, a plurality of positive pressure generating rails being formed on said surface of said slider body to float said slider body by positive pressure generated due to a fluid flow caused by movement of said recording medium relative to said slider body, and a bleed section formed in said surface of said slider body between said plurality of positive pressure generating rails, said bleed section having a fluid-inlet end and a fluid-outlet end and having a cross-sectional area taken transversely of a flow of fluid through said bleed section, said cross-sectional area being smaller in said fluid-inlet end than in said fluid-outlet end, and stepped bearing means formed in each of said positive pressure generating rails adjacent to a fluid inlet end thereof for generating a floating force, each of said stepped bearing means comprising a recess in the fluid inlet end of an associated positive pressure generating rail.

2. A flying head slider according to claim 1, in which each of said recesses has a fluid-inlet end and a fluid-outlet end and has a width measured laterally of the fluid flow through the recess, said width decreasing gradually from said fluid-inlet end to said fluid-outlet end.

3. A flying head slider according to claim 1, wherein each of said recesses includes sidewalls spaced laterally of a fluid flow which enters the recess, said sidewalls surrounding the fluid flow laterally thereof to minimize lateral flows of the fluid in the recess.

4. A flying head slider comprising a slider body on which at least one transducer is to be mounted, said slider body having a surface, a plurality of positive pressure generating rails formed on said surface of said slider body, and a stepped bearing means formed in each of said positive pressure generating rails adjacent to a leading edge thereof for generating a floating force, each of said stepped bearing means comprising a recess in the fluid inlet end of an associated positive pressure generating rail.

5. A flying head slider according to claim 4, wherein each of said recesses includes sidewalls spaced laterally of a fluid flow which enters the recess, said sidewalls surrounding the fluid flow laterally thereof to minimize lateral flows of the fluid in the recess.

6. A flying head slider comprising a slider body having a trailing end of which at least one transducer is to be mounted, said slider body having a surface, a plurality of positive pressure generating rails formed on said surface of said slider body, a bleed section formed in said surface of said slider body between said positive pressure generating rails, said bleed section extending parallel to lengths of said positive pressure generating rails, said bleed section having a width measured transversely of the lengths of said positive pressure generating rails, said width being smaller in a first portion adjacent to a leading edge of said slider body than in a second portion adjacent to a trailing edge of said slider body, and a stepped bearing means formed in each of said positive pressure generating rails adjacent to a leading end thereof for generating a floating force, each of said stepped bearing means comprising a recess in the fluid inlet end of an associated positive pressure generating rail.

7. A flying head slider according to claim 6, wherein each of said recesses includes sidewalls spaced laterally of a fluid flow which enters the recess, said sidewalls surrounding the fluid flow laterally thereof to minimize lateral flows of the fluid in the recess.

8. A flying head slider comprising a slider body on which at least one transducer is to be mounted, said slider body having a fluid bearing surface, a plurality of positive pressure generating rails formed on said fluid bearing surface along opposite side edges thereof, stepped bearing means formed in each of said positive pressure generating rails adjacent to a leading edge thereof for generating a floating force, and a sliding resistant member disposed on each of said positive pressure generating rails around a periphery of each of said stepped bearing, each of said stepped bearing means comprising a recess in the fluid inlet end of an associated positive pressure generating rail.

9. A flying head slider according to claim 8, wherein each of said recesses includes sidewalls spaced laterally of a fluid flow which enters the recess, said sidewalls surrounding the fluid flow laterally thereof to minimize lateral flows of the fluid in the recess.

10. A flying head slider comprising a slider body disposed in opposed relationship to a recording medium and including a fluid bearing surface faced to said recording medium, a plurality of positive pressure generating rails formed on said fluid bearing surface of said slider body to float said slider body by positive pressure generated due to a fluid flow caused by movement of said recording medium relative to said slider body, a bleed section formed in said surface of said slider body between said plurality of positive pressure generating rails, said bleed section having a fluid-inlet end and a fluid-outlet end and having a cross-sectional area taken transversely of a flow of fluid through said bleed section, said cross-sectional area being smaller in said fluid-inlet end than in said fluid-outlet end, stepped bearing means formed in each of said positive pressure generating rails adjacent to a fluid-inlet end thereof for generating a floating force, and a sliding resistant member disposed on each of said positive pressure generating rails around a periphery of each of said stepped bearing means and projecting from a surface of an associated positive pressure generating rail, each of said stepped bearing means comprising a recess in the fluid inlet end of an associated positive pressure generating rails.

11. A flying head slider according to claim 10, in which each of said rails has a fluid-outlet and remote from said fluid inlet end and a width which gradually decreases from said fluid-inlet end to said fluid-outlet end.

12. A flying head slider according to claim 10, wherein each of said recesses includes sidewalls spaced laterally of a fluid flow which enters the recess, said sidewalls surrounding the fluid flow laterally thereof to minimize lateral flows of the fluid in the recess.

13. A flying head slider comprising a slider body disposed in opposed relationship to a recording medium and including a fluid bearing surface faced to said recording medium, a plurality of positive pressure generating rails formed on said fluid bearing surface of said slider body to float said slider body by positive pressure generated due to a fluid flow caused by movement of said recording medium relative to said slider body, a bleed section formed in said fluid bearing surface of said slider body between said plurality of positive pressure generating rails, said bleed section having a fluid-inlet end and a fluid-outlet end and a cross-sectional area taken transversely of a flow of fluid through said bleed section, a gate disposed to reduce the cross-sectional area of said bleed section in said fluid-inlet end, and stepped bearing means formed in each of said positive pressure generating rails adjacent to a fluid-inlet end thereof for generating a floating force, each of said stepped bearing means comprising a recess in the fluid inlet end of an associated positive pressure generating rail.

14. A flying head slider according to claim 13, wherein each of said recesses includes sidewalls spaced laterally of a fluid flow which enters the recess, said sidewalls surrounding the fluid flow laterally thereof to minimize lateral flows of the fluid in the recess.

15. A flying head slider comprising a slider body disposed in opposed relationship to a recording medium and including a fluid bearing surface faced to said recording medium, a plurality of positive pressure generating means formed on said fluid bearing surface of said slider body to float said slider body by positive pressure generated due to a fluid flow caused by movement of said recording medium relative to said slider body, a bleed section formed in said fluid bearing surface of said slider body between said plurality of positive pressure generating means, said bleed section having a fluid-inlet end and a fluid-outlet end and a cross-sectional area taken transversely of a flow of fluid through said bleed section, a gate disposed to reduce the cross-sectional area of said bleed section in said fluid-inlet end, stepped bearing means formed in each of said positive pressure generating means adjacent to a fluid-inlet end thereof, and a sliding resistant member disposed around a periphery of each of said stepped bearing means and projecting from a surface of an associated positive pressure generating means.

16. A flying head slider comprising a slider body disposed in opposed relationship to a recording medium and including a fluid bearing surface faced to said recording medium, a plurality of positive pressure generating means formed on said fluid bearing surface of said slider body to float said slider body by positive pressure generated due to a fluid flow caused by movement of said recording medium relative to said slider body, a bleed section formed in said fluid bearing surface of said slider body between said plurality of positive pressure generating means an oblique surface formed on each of said positive pressure generating means adjacent to a fluid-inlet end thereof, said bleed section having a fluid-inlet end and a fluid-outlet end and a cross-sectional area taken transversely of a flow of fluid through said bleed section, a gate member disposed to reduce the cross-sectional area of said bleed section in said fluid-inlet end and having a surface faced toward said recording medium, and a sliding resistant member disposed on said surface of said gate member, said sliding resistant member projecting from said gate member to a level closer to said recording medium than said positive pressure generating means.

17. A flying head slider according to claim 16, wherein said bleed section formed in said fluid bearing surface of said slider body comprises a recess formed in said fluid bearing surface.

18. A flying head slider according to claim 17, wherein said oblique surface formed on each of said positive pressure generating means generates a floating force.

19. A flying head slider according to claim 16, wherein said oblique surface formed on each of said positive pressure generating means generates a floating force.

20. A flying head slider including a slider body on which at least one transducer is to be mounted, a plurality of positive pressure generating rails for generating a positive pressure due to a fluid flow caused by a rotation of an associated recording medium relative to said slider body, means for generating a negative pressure disposed between said plurality of positive pressure generating rails and stepped bearing means formed on said slider body adjacent to a fluid-inlet end thereof and respectively associated with said plurality of pressure generating rails for generating a floating force, each of said stepped bearing means comprising a recess in the fluid inlet end of an associated positive pressure generating rail.

21. A flying head slider according to claim 20, in which each of said recesses has a fluid-inlet end and a fluid-outlet end and a width measured transversely of a flow of fluid in the recess, said width being decreased gradually from said fluid-inlet end to said fluid-outlet end.

22. A flying head slider according to claim 20, wherein each of said recesses includes sidewalls spaced laterally of a fluid flow which enters the recess, said sidewalls surrounding the fluid flow laterally thereof to minimize lateral flows of the fluid in the recess.

* * * * *